United States Patent
Sugishita

Patent Number: 6,109,019
Date of Patent: *Aug. 29, 2000

[54] STEAM COOLED GAS TURBINE SYSTEM

[75] Inventor: Hideaki Sugishita, Takasago, Japan

[73] Assignee: Mitsubishi Heavy Industries, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/031,677

[22] Filed: Feb. 27, 1998

[51] Int. Cl.[7] .................. F02C 6/18; F02C 7/12
[52] U.S. Cl. ............... 60/39.182; 60/39.75; 60/730
[58] Field of Search ................ 60/39.02, 39.182, 60/39.75, 730

[56] References Cited

U.S. PATENT DOCUMENTS

| | | | |
|---|---|---|---|
| 4,424,668 | 1/1984 | Muckerjee | 60/39.182 |
| 4,571,935 | 2/1986 | Rice | |
| 5,428,950 | 7/1995 | Tomlinson et al. | 60/39.182 |
| 5,826,430 | 10/1998 | Little | 60/736 |

FOREIGN PATENT DOCUMENTS

| | | |
|---|---|---|
| 0674099 A1 | 9/1995 | European Pat. Off. |
| 0764767 A2 | 3/1997 | European Pat. Off. |
| 6173616 | 6/1994 | Japan |

OTHER PUBLICATIONS

Patent Abstracts of Japan, Abstract for 06–173616, published Jun. 21, 1994, Watanabe Naomichi.
Patent Abstracts of Japan, Abstract for 09–013917, published Jan. 14, 1998, Fujii Kenji.
Patent Abstracts of Japan, Abstract for 08–061012, published Mar. 5, 1996, Kawai Jun.
Patent Abstracts of Japan, Abstract for JP 07–004210, published Jan. 10, 1995, Noguchi Yoshiki.
Patent Abstracts of Japan—Abstract for JP 06–323162 A, published Nov. 22, 1994; Nakamura Shozo.

*Primary Examiner*—Louis J. Casaregola
*Attorney, Agent, or Firm*—Birch, Stewart, Kolasch & Birch, LLP

[57] ABSTRACT

A steam cooled gas turbine system in a combined power plant, constituted such that a tail pipe of a combustor is cooled with intermediate pressure steam from an exhaust heat recovery boiler, or outlet bleed steam from a high pressure turbine, and the cooling steam is recovered into an intermediate pressure turbine or an intermediate area of a reheater of the exhaust heat recovery boiler, whereby thermal efficiency is improved, and a cut in $NO_x$ is achieved.

6 Claims, 4 Drawing Sheets

STEAM COOLED GAS TURBINE SYSTEM

BACKGROUND OF THE INVENTION

This invention relates to a gas turbine system in which a combustor exhaust pipe of a gas turbine and gas turbine blades are steam cooled.

A conventional gas turbine system is described with reference to FIG. 4.

As shown in FIG. 4, a conventional gas turbine system which uses steam in cooling the blades of a gas turbine 4 is configured as follows: Cooling steam is bled from an outlet of a high pressure turbine 7, and cools the blades of the gas turbine 4. The steam is then recovered into an inlet of an intermediate pressure turbine 8. A tail pipe of a combustor 6 is not steam cooled, but is air cooled with compressed air.

The other subsystems of the gas turbine system constitute the same system diagram as for a gas turbine combined cycle plant in general use. The numeral 01 denotes a gas turbine, 02 an exhaust heat recovery boiler, 7 a high pressure turbine, 8 an intermediate pressure turbine, and 9 a low pressure turbine. The air is sucked into a compressor 5, and compressed there to a predetermined pressure. Then, fuel adjusted to have a predetermined temperature at an inlet of a turbine 4 and air pressurized by the compressor 5 are mixed and burnt in the combustor 6.

An exhaust pipe portion of the combustor 6 is of the type to be cooled with discharge air from the compressor 5. That is, at the inlet of the turbine 4, a high temperature, high pressure combustion gas generated by the combustor 6 is expanded to produce output, which causes a generator 18 to generate power. Exhaust gas after completion of work is supplied to the exhaust heat recovery boiler 02 through an exhaust gas duct 10.

A turbine stationary blade and a turbine moving blade of the turbine 4 are cooled with steam fed from an outlet of the high pressure turbine 7 through a blade cooling steam supply piping 11. Heated steam after cooling is recovered into an inlet of the intermediate pressure turbine 8 via a blade cooling steam recovery piping 12.

In the exhaust heat recovery boiler 02, on the other hand, superheated steam is produced by a low pressure drum 1, an intermediate pressure drum 2, and a high pressure drum 3. Steam generated by the high pressure drum 3 is guided to the high pressure turbine 7 through a high pressure steam piping 13, and expanded in the high pressure turbine 7 to generate output.

Output steam from the high pressure turbine 7 is branched into a portion which is guided to the turbine stationary blade and moving blade of the gas turbine 01 by the blade cooling steam supply piping 11, and a portion which is guided to a reheater of the exhaust heat recovery boiler 02.

Steam produced by the intermediate pressure drum 2 is sent through an intermediate pressure steam piping 14, and mixed with the outlet steam from the high pressure turbine 7 at the inlet of the reheater. Then, the mixed steam is introduced into the reheater, where it is heated. The heated steam is mixed with the blade cooling steam guided by the blade cooling steam recovery piping 12, and fed to the inlet of the intermediate pressure turbine 8.

Then, this steam is expanded by the intermediate pressure turbine 8 to generate output. Then, it is mixed with superheated steam which has been produced by the low pressure drum 1 and supplied via a low pressure steam piping 15. The mixture is fed to an inlet of the low pressure turbine 9.

The steam supplied to the inlet of the low pressure turbine 9 is expanded by the low pressure turbine 9 to generate output to a generator 19. Then, steam is condensed by a condenser 20, and pressurized by a pressure pump 21 to a predetermined pressure. Then, the condensate is fed to the exhaust heat recovery boiler 02 through a feed water piping 22.

As stated earlier, according to the conventional steam cooled gas turbine system, output steam from the high pressure turbine 7 was used only for blade cooling. The site of its recovery was the inlet of the intermediate pressure turbine 8. The cooling of the exhaust pipe of the combustor 6 was performed not with steam, but with outlet air from the compressor 5.

With such a gas turbine system, it has been customary practice to elevate the inlet temperature of the turbine 4 in order to achieve a further improvement in thermal efficiency. If the inlet temperature of the turbine 4 is raised, however, cooling air for the exhaust pipe of the combustor 6 will be needed in a large amount. Thus, combustion air based on the same supply source will decrease. As a result, the equivalence ratio of fuel to the combustion air lowers, causing a possibility for unstable combustion.

Furthermore, the necessity for further raising the combustion temperature by the increase in the amount of cooling air for the combustor 6 will lead to an increase in the amount of $NO_x$ generated. Also, the temperature distribution in the radial direction of the outlet of the turbine 4 will enlarge, reducing the efficiency of the turbine 4.

SUMMARY OF THE INVENTION

It is an object of the present invention to provide a steam cooled gas turbine system free from the problems with the conventional system and capable of performing more effective steam cooling.

The present invention for attaining this object provides a steam cooled gas turbine system in a combined power plant which comprises a combination of a gas turbine plant and a steam turbine plant, and includes an exhaust heat recovery boiler for generating steam turbine driving steam by utilizing exhaust heat from a gas turbine; wherein intermediate pressure generated steam from the exhaust heat recovery boiler is used as cooling steam for a exhaust pipe of a combustor, and the cooling steam becoming hot after cooling is recovered into an intermediate pressure turbine. According to this system, intermediate pressure generated steam is used to cool the exhaust pipe of the combustor. At this position, therefore, the combustor cooling air becomes unnecessary, and the corresponding amount of air can be used as combustion air, making the equivalence ratio of air in the combustion area sufficiently high. Consequently, stable combustion by the combustor can be ensured.

This absence of cooling air at the position of the combustor exhaust pipe reduces a drop in the combustion temperature of combustion gas until its arrival at the turbine inlet. Here, steam cooling in the invention is compared with air cooling, with a certain turbine inlet temperature as a reference. The comparison shows that steam cooling involves a lower combustion temperature, but can maintain the certain turbine inlet temperature.

Hence, steam cooling can reduce the amount of $NO_x$ generated.

The present invention also provides the above described steam cooled gas turbine system in which steam bled from an outlet of a high pressure turbine is used, instead of the intermediate pressure generated steam from the exhaust heat recovery boiler, to cool the exhaust pipe of the combustor. As noted from this, the cooling steam used for the exhaust pipe of the combustor is not steam generated by the intermediate pressure drum, but outlet steam bled from the high pressure turbine which is ample in amount. Thus, no restriction is imposed on the flow rate of the intermediate pressure generated steam. Usually, the pinch point temperature difference of the high pressure drum is enlarged in order to secure the amount of cooling steam for the combustor exhaust pipe; however, this measure may cause a decrease in the overall efficiency. This possibility is eliminated by the use of the bled outlet steam.

The present invention also provides the steam cooled gas turbine system in which the cooling steam is recovered into an intermediate area of a reheater of the exhaust heat recovery boiler, rather than recovered into the intermediate pressure turbine. As noted from this, the cooling steam is not directly recovered into the intermediate pressure turbine, but recovered into the intermediate area of the reheater of the exhaust heat recovery boiler. Thus, the recovered cooling steam is temperature-adjusted in the intermediate and subsequent areas of the reheater, and then delivered into the inlet of the intermediate pressure turbine. Hence, there is no need to consider a temperature rise in the exhaust pipe in connection with the temperature of the inlet of the intermediate pressure turbine. The temperature rise in the exhaust pipe can be set to be small, a cooling structure for use in exhaust pipe cooling can be simplified, and a pressure loss of cooling steam can be reduced. Consequently, the combined efficiency can be increased.

The present invention also provides the steam cooled gas turbine system including the steps of cooling the blades of the gas turbine by the use of steam bled from the outlet of the high pressure turbine, and recovering the cooling steam, which has become hot after cooling, into the intermediate area of the reheater of the exhaust heat recovery boiler. As noted from this, the areas to be cooled include not only the exhaust pipe of the combustor, but also the blades of the gas turbine. Steam used to cool the gas turbine blades is bleed steam from the high pressure turbine outlet which is in a sufficient amount. Furthermore, the steam after cooling is recovered into the intermediate portion of the reheater, so that the necessary temperature for a downstream part, e.g., the intermediate pressure turbine, can be adjusted independently of the cooled area.

DETAILED DESCRIPTION OF THE PREFERRED EMBODIMENTS

A first embodiment of the present invention will now be described with reference to FIG. 1. The same parts as in the aforementioned conventional system are assigned the same numerals and symbols, and an overlapping explanation is omitted.

Figure 1:
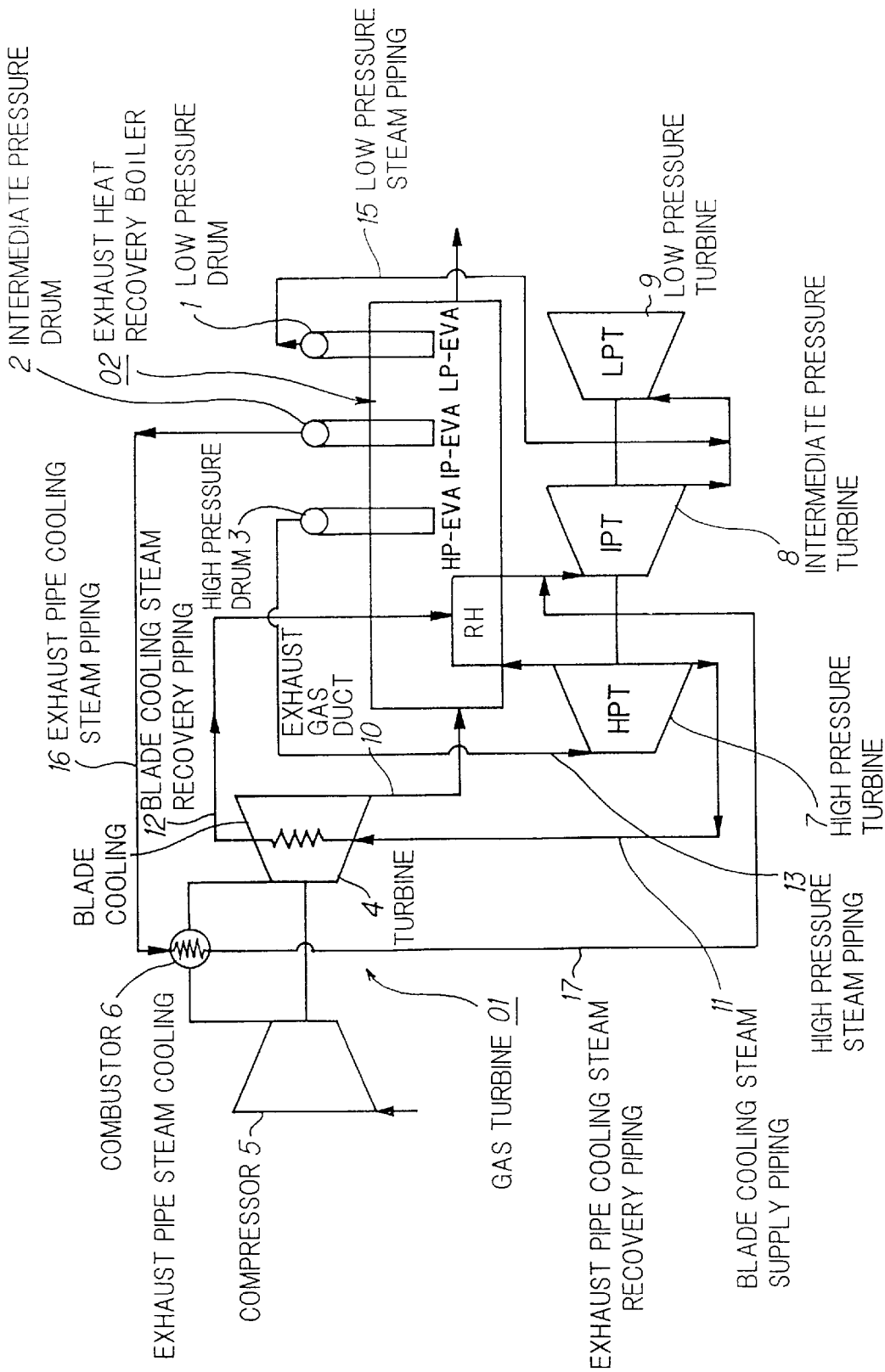
FIG. 1 is a system diagram of a steam cooled gas turbine system concerned with a first embodiment of the present invention.

This embodiment, as illustrated in FIG. 1, adopts a steam cooling method which uses steam generated by an intermediate pressure drum 2, rather than a conventional air cooling method, as a means of cooling a exhaust pipe of a combustor 6. That is, exhaust pipe cooling steam for combustor 6 is steam generated by the intermediate pressure drum 2, guided by a exhaust pipe cooling steam piping 16, and supplied to the exhaust pipe of the combustor 6.

The supply temperature of this cooling steam is slightly higher than the saturation temperature of steam under the pressure in the intermediate pressure drum 2. Thus, the amount of drain generated in the exhaust pipe cooling steam piping 16 for the combustor 6 can be minimized.

Steam heated by the exhaust pipe of the combustor 6 has been heated to practically the same temperature as that of steam produced by the reheater RH of the exhaust heat recovery boiler 2, and is mixed with this steam past a exhaust pipe cooling steam recovery piping 17. The mixed steam is fed to an intermediate pressure turbine 8, where its power is recovered.

As described above, the instant embodiment employs the steam cooling method in cooling the exhaust pipe of the combustor 6. Thus, air supplied to the exhaust pipe portion in the conventional air cooling method become unnecessary. This air can be allocated to combustion air for the combustor 6. Hence, the equivalence ratio of combustion air necessary for stable combustion can be made high to achieve stable combustion.

As stated earlier, the absence of cooling air at the exhaust pipe portion means a decreased drop in the temperature of combustion gas until the combustion gas arrives at the turbine inlet. Compared with the conventional air cooling method, therefore, the combustion temperature can be set to be low, so that the amount of $NO_x$ generated can be decreased.

A second embodiment of the present invention will now be described with reference to FIG. 2. The same parts as in the aforementioned conventional system and the first embodiment of the invention are assigned the same numerals and symbols, and an overlapping explanation is omitted.

This embodiment involves a system of using outlet steambled from a high pressure turbine 7, rather than using generated steam from an intermediate pressure drum 2, as steam for cooling a exhaust pipe of a combustor 6. The other subsystems are the same as in the first embodiment illustrated in FIG. 1.

As a result, no restriction is imposed on the flow rate of the intermediate pressure generated steam from the intermediate pressure drum 2. Thus, there is no need to enlarge the pinch point temperature difference of a high pressure drum 3 in order to secure the amount of cooling steam for the exhaust pipe of the combustor 6. This increases the degree of freedom in setting the pinch point temperature difference.

This relationship will be described in further detail. With the aforementioned embodiment which uses intermediate pressure generated steam for cooling the exhaust pipe of the combustor 6, the steam temperature after exhaust pipe steam cooling should desirably be the same temperature as the inlet temperature of the intermediate pressure turbine 8 in order to set a high thermal efficiency.

This is because if the steam temperature after exhaust pipe cooling is lower than the inlet temperature of the intermediate pressure turbine 8, this steam temperature lowers the inlet temperature of the intermediate pressure turbine 8. Moreover, in case the amount of heat imparted to the cooling steam upon steam cooling at the exhaust pipe is absorbed by the intermediate pressure generated steam, the required amount of cooling steam can be determined, because the temperature of cooling steam after cooling has been determined as set forth above.

When the pinch point temperature difference in the high pressure and intermediate pressure drums is set at a constant value of, say, 15° C., the amount of the exhaust pipe cooling steam cannot be set arbitrarily. Since the flow rate of the intermediate pressure generated steam is not sufficient for the intended purpose, it becomes necessary to set a large pinch point temperature difference in the high pressure drum, thereby securing the necessary amount of the intermediate pressure generated steam.

To increase thermal efficiency, on the other hand, it is a necessary and sufficient condition to set a small pinch point temperature difference in the high pressure drum. Thus, the above-mentioned dependence on intermediate pressure generated steam is not preferred. If a sufficient amount of intermediate pressure generated steam cannot be secured, the use of intermediate pressure generated steam for exhaust pipe cooling should be avoided from the point of view of increased thermal efficiency.

Under these circumstances, the instant embodiment uses outlet bleed steam from the high pressure turbine 7 is used as steam for exhaust pipe cooling. By so doing, cooling steam for the exhaust pipe can be secured in a sufficient amount.

Incidentally, the aforesaid pinch point temperature difference, i.e., the difference between the exhaust gas temperature and the saturation water temperature in each of the high pressure, intermediate pressure and low pressure drums, is a value which determines the flow rate of generated steam in each drum.

The lower this value, the larger the amount of heat absorbed in the drum becomes, and the larger the amount of generated steam becomes. This leads to improved thermal efficiency. However, the heat transfer area of the exhaust heat recovery boiler enlarges, thereby increasing the cost. In designing and producing the exhaust heat recovery boiler, therefore, it is common practice to set the pinch point temperature difference at about 10 to 15° C. in view of the cost and performance.

According to the instant embodiment, therefore, no restriction is imposed on the flow rate of the intermediate pressure generated steam. If the flow rate of the intermediate pressure generated steam can be ensured, there is no need to enlarge the pinch point temperature difference of the high pressure drum. It is possible to set the pinch point temperature difference of the high pressure drum at a constant value of 15° C. This removes the possibility for inducing a fall in the overall thermal efficiency.

A third embodiment of the present invention will now be described with reference to FIG. 3. The same parts as in the aforementioned conventional system and the first and second embodiments of the invention are assigned the same numerals and symbols, and an overlapping explanation is omitted.

This embodiment involves a system in which a temperature rise in cooling steam for a exhaust pipe of a combustor 6 is set to be small, and cooling steam is not recovered into an inlet of a reheater of an exhaust heat recovery boiler 02, but recovered into an intermediate area of the reheater. The other subsystems are the same as in the second embodiment illustrated in FIG. 2.

With a system which recovers cooling steam for exhaust pipe cooling into an inlet of an intermediate pressure turbine 8, equalizing the temperature of the cooling steam with a predetermined inlet temperature of the intermediate pressure turbine 8 is necessary to set a high thermal efficiency. In the instant embodiment, on the other hand, exhaust pipe cooling steam is recovered to a midway point of a reheater RH. By this measure, no matter how much the temperature of cooling steam rises in the exhaust pipe, this temperature rise does not affect the inlet temperature of the intermediate pressure turbine 8. Thus, there is no influence on the overall efficiency, and the temperature rise during exhaust pipe cooling of the combustor 6 can be set to be small. Thus, a cooling structure for use in exhaust pipe cooling can be simplified, a pressure loss of cooling steam can be decreased, and the inlet pressure of the intermediate pressure turbine 8 can be set to be that higher. This is effective in increasing the combined efficiency.

According to a first aspect of the present invention depicted in FIG. 1, intermediate pressure generated steam is used to cool the exhaust pipe of the combustor, and the cooling steam is recovered into the intermediate pressure turbine. Thus, the following effects are obtained:

① Combustor cooling air can be decreased, and the equivalence ratio for stable combustion can be made sufficiently high.

② Since the combustion temperature can be lowered, the amount of $NO_x$ generated can be decreased.

③ The temperature distribution in the radial direction at the turbine inlet can be averaged.

Figure 2:
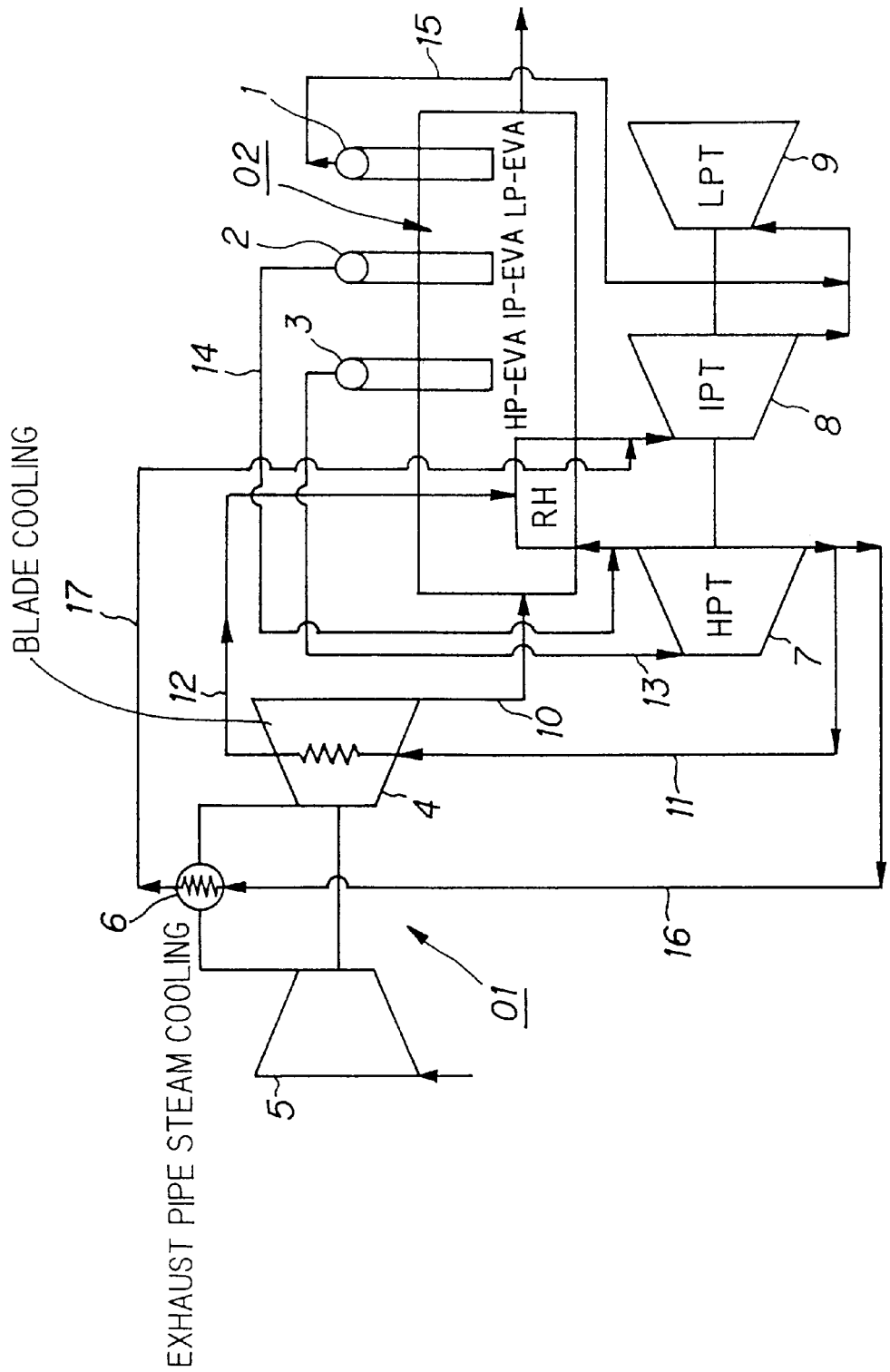
FIG. 2 is a system diagram of a steam cooled gas turbine system concerned with a second embodiment of the present invention.

According to a second aspect of the present invention depicted in FIG. 2, steam bled from the outlet of the high pressure turbine is used to cool the exhaust pipe of the combustor, and the cooling steam is recovered into the intermediate pressure turbine. Thus, the following effects are obtained:

① The amount of intermediate pressure generated steam (having the highest overall performance) can be set to satisfy arbitrary conditions. Thus, the possibility is eliminated that in order to secure the amount of cooling steam for the combustor exhaust pipe, the pinch point temperature difference of the high pressure drum is enlarged, thereby inducing a decrease in the overall efficiency.

According to a third aspect of the present invention, steam after cooling of the combustor exhaust pipe is recovered into the intermediate area of the reheater. Thus, the following effects are obtained:

① The temperature rise of cooling steam for the combustor exhaust pipe is set to be small, a pressure loss of cooling steam is decreased, and the overall performance is improved.

Figure 3:
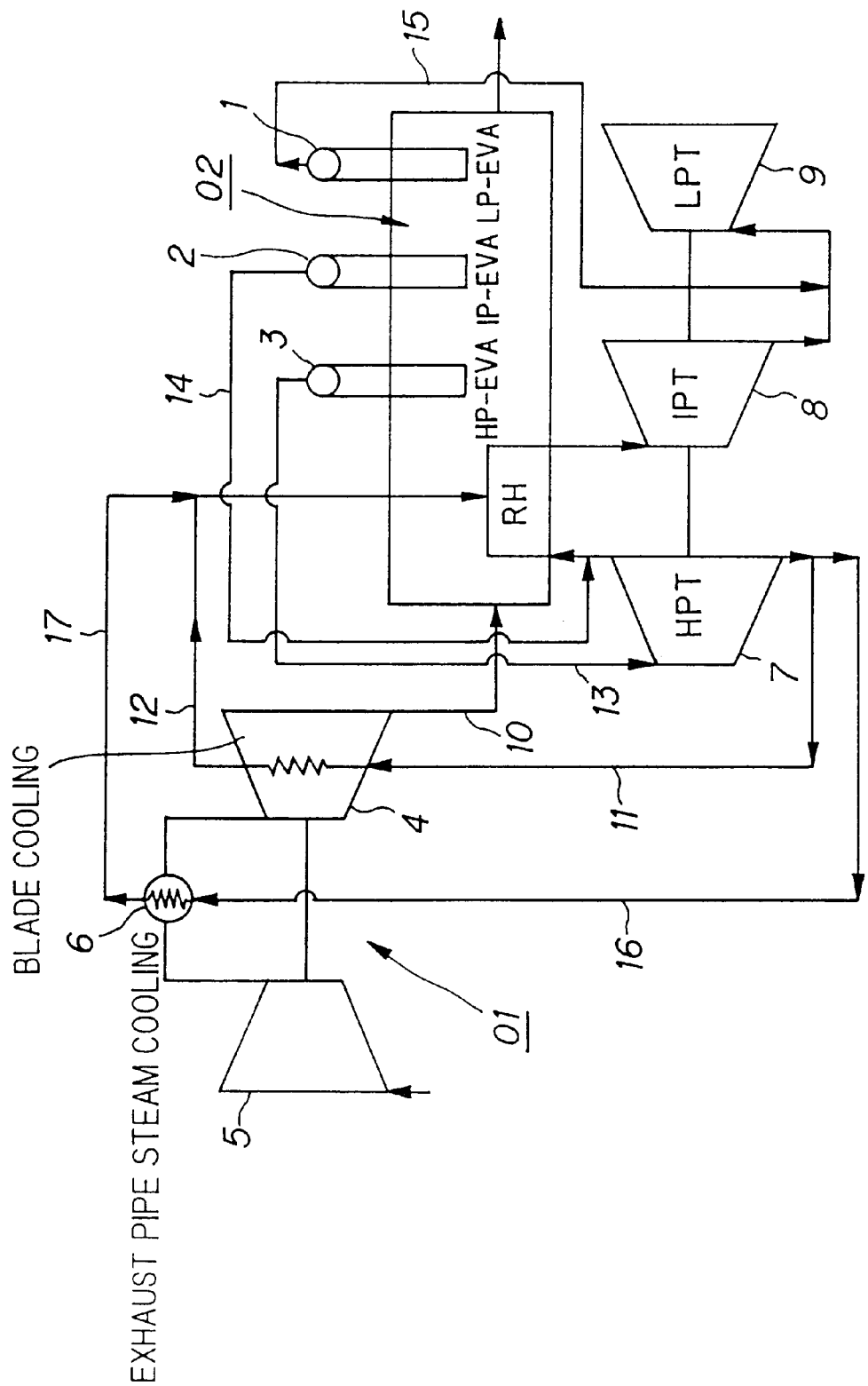
FIG. 3 is a system diagram of a steam cooled gas turbine system concerned with a third embodiment of the present invention.
Figure 4:
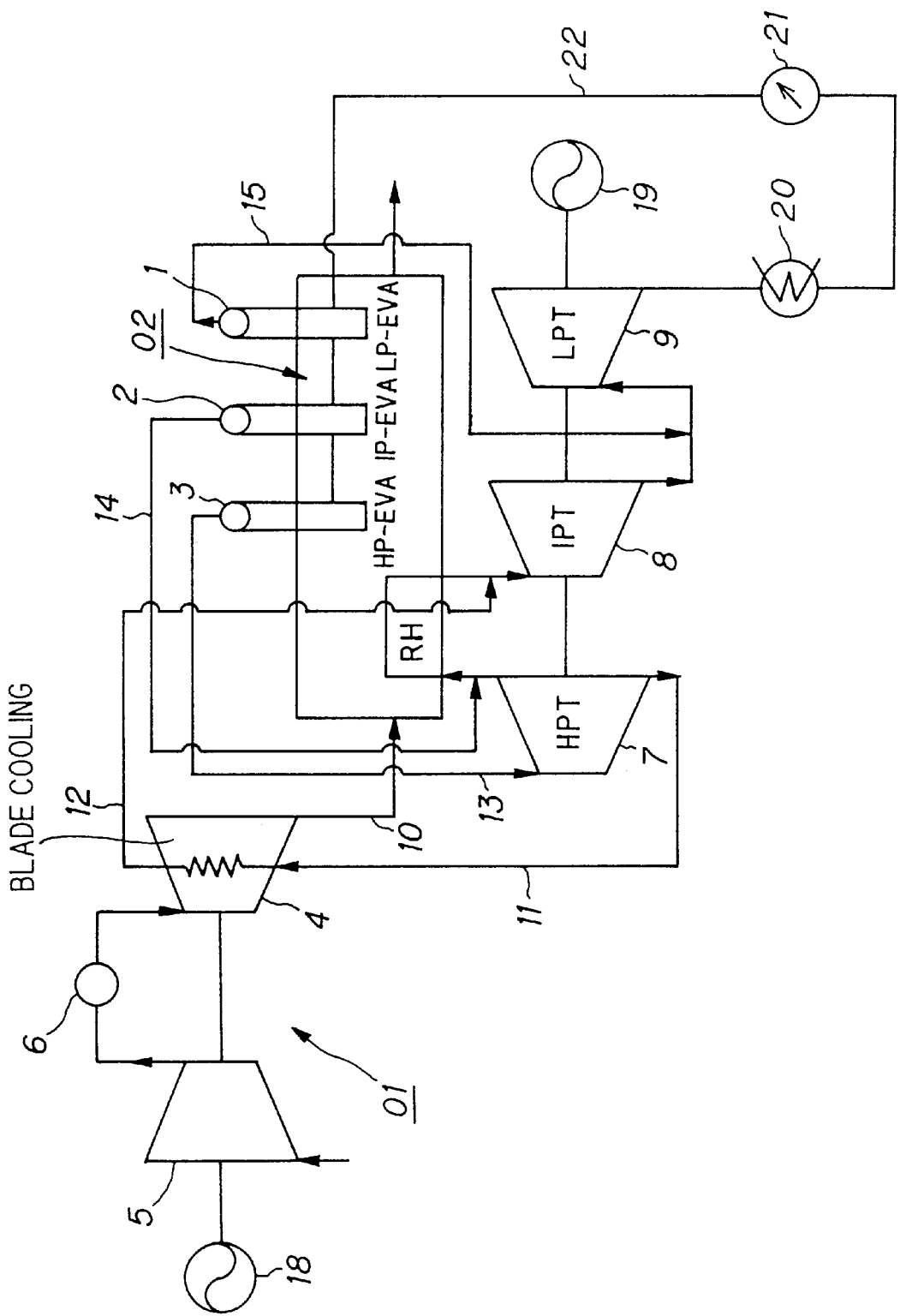
FIG. 4 is a system diagram of a conventional gas turbine system which uses air cooling and steam cooling jointly.

According to a fourth aspect of the present invention depicted in FIG. 3, the blades of the gas turbine as well as the combustor exhaust pipe are cooled by the use of steam bled from the outlet of the high pressure turbine, and the cooling steam is recovered into the intermediate area of the reheater together with the cooling steam for the combustor exhaust pipe. Thus, the following effects are obtained:

① Heat is recovered from all of the hottest portions of the steam turbine, and the necessary temperature for a downstream part such as the intermediate pressure turbine can be adjusted independently of heat recovery in each cooled area.

While the present invention has been described with reference to the illustrated embodiments, it is to be understood that the invention is not restricted thereby, but various changes and modifications may be made in the concrete structure of the invention without departing from the spirit and scope of the invention.

What is claimed is:

1. In a steam cooled gas turbine system in a combined power plant which comprises a combination of a gas turbine plant and a steam turbine plant including a plurality of turbines having different pressure inputs, and includes an exhaust heat recovery boiler for generating steam turbine driving steam by utilizing exhaust heat from a gas turbine of the gas turbine plant, the improvement comprising:

means for supplying generated steam from the exhaust heat recovery boiler as cooling steam for an exhaust pipe of a combustor;

means for recovering the cooling steam applied to the exhaust pipe and applying the recovered steam to the steam turbine plant; and means for cooling the blades of the gas turbine by the use of steam bled from the outlet of a high pressure turbine of the steam turbine plant, and recovering the cooling steam, which has become hot after cooling, into an area of the reheater of the exhaust heat recovery boiler.

2. The system of claim 1 wherein said means for supplying generated steam comprises means for supplying steam from an intermediate pressure drum of the exhaust heat recovery boiler to the exhaust pipe; and wherein the recovery means directs the recovered cooling steam to an intermediate pressure turbine of the steam turbine plant.

3. The system of claim 1 further including:

means for supplying steam from a high pressure turbine of the steam turbine plant to the conduit for cooling the exhaust pipe; and wherein the recovery device directs the recovered cooling steam to a reheater of the exhaust recovery boiler.

4. The system of claim 1 further including:

means for supplying steam from an intermediate pressure turbine of the steam turbine plant to the conduit for cooling the exhaust pipe; and wherein the recovery device directs the recovered cooling steam to a reheater of the exhaust recovery boiler.

5. In a steam cooled gas turbine system in a combined power plant which comprises a combination of a gas turbine plant and a steam turbine plant including a plurality of turbines having different pressure inputs, and includes an exhaust heat recovery boiler for generating steam turbine driving steam by utilizing exhaust heat from a gas turbine of the gas turbine plant, the improvement comprising:

steam piping means for supplying cooling steam from the exhaust heat recovery boiler to an exhaust pipe of a combustor;

steam recovery piping means connect to the exhaust pipe of the combustor for applying the recovered steam to an intermediate pressure turbine of the steam turbine plant;

cooling steam supply piping means for cooling the blades of the gas turbine plant connected from an outlet of a high pressure turbine of the steam turbine to the gas turbine, and blade cooling steam recovery piping means connected from the gas turbine to an intermediate area of the reheater of the exhaust heat recovery boiler.

6. The system of claim 5 and additionally including steam supply piping means connected from the reheater to the intermediate pressure turbine for mixing steam from the reheater with the steam recovered from the exhaust pipe of the combustor.

* * * * *